United States Patent
Fujisawa et al.

(10) Patent No.: US 9,025,297 B2
(45) Date of Patent: May 5, 2015

(54) SURGE PROTECTION CIRCUIT IN THREE-PHASE FOUR-WIRE CIRCUIT

(75) Inventors: Toshinobu Fujisawa, Osaka (JP);
Masaaki Ono, Osaka (JP); Kenji Ogata, Osaka (JP); Keisuke Kawakita, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 234 days.

(21) Appl. No.: 13/391,870

(22) PCT Filed: Aug. 17, 2010

(86) PCT No.: PCT/JP2010/063846
§ 371 (c)(1),
(2), (4) Date: Feb. 23, 2012

(87) PCT Pub. No.: WO2011/024669
PCT Pub. Date: Mar. 3, 2011

(65) Prior Publication Data
US 2012/0147512 A1  Jun. 14, 2012

(30) Foreign Application Priority Data
Aug. 27, 2009  (JP) ................................ 2009-196584

(51) Int. Cl.
*H02H 3/22* (2006.01)
*H02H 9/04* (2006.01)

(52) U.S. Cl.
CPC .................................... *H02H 9/042* (2013.01)

(58) Field of Classification Search
USPC .......................................... 361/56, 91.1, 111
See application file for complete search history.

(56) References Cited

U.S. PATENT DOCUMENTS

| 4,152,743 A | 5/1979 | Comstock |
| 5,790,359 A | 8/1998 | Kapp et al. |
| 5,986,870 A | 11/1999 | Kapp |
| 6,477,025 B1* | 11/2002 | Goldbach et al. ............. 361/103 |
| 7,417,841 B2* | 8/2008 | Hotchkiss et al. ............. 361/103 |
| 2010/0091423 A1* | 4/2010 | Johnson ........................ 361/118 |

FOREIGN PATENT DOCUMENTS

| EP | 0561149 A2 | 9/1993 |
| JP | 06-030525 A | 2/1994 |
| JP | 2003-051364 A | 2/2003 |

(Continued)

OTHER PUBLICATIONS

International Search Report dated Nov. 22, 2010, issued for PCT/JP2010/063846.

(Continued)

*Primary Examiner* — Thienvu Tran
*Assistant Examiner* — Tien Mai
(74) *Attorney, Agent, or Firm* — Locke Lord LLP

(57) ABSTRACT

In a surge protection circuit in a three-phase four-wire circuit, a first three-phase three-wire surge module includes terminals respectively coupled to a first phase R, a second phase S, a third phase T, and a fifth phase E. A single-phase two-wire surge module includes terminals respectively coupled to one phase R among the first phase R, the second phase S, and the third phase T, to a fourth phase N, and to the fifth phase E. The second three-phase three-wire surge module includes terminals respectively coupled to the two phases S and T among the first phase R, the second phase S, and the third phase T, to the fourth phase N, and to the fifth phase E. The two phases S and T are not coupled to the single-phase two-wire surge module.

3 Claims, 3 Drawing Sheets

(56) References Cited

FOREIGN PATENT DOCUMENTS

| JP | 2005-216829 A | 8/2005 |
|---|---|---|
| JP | 2009-183024 A | 8/2009 |

OTHER PUBLICATIONS

Supplementary European Search Report dated Jun. 18, 2013, issued for the corresponding European patent application No. 10811719.3.

* cited by examiner

SURGE PROTECTION CIRCUIT IN THREE-PHASE FOUR-WIRE CIRCUIT

TECHNICAL FIELD

The present invention relates to surge protection circuits in three-phase four-wire circuits, and in particular, to a surge protection circuit in a three-phase four-wire circuit with an independent earthing wire.

BACKGROUND ART

Patent document 1 below discloses a surge protection circuit in a three-phase four-wire circuit, which is coupled between a system side and a load side. The surge protection circuit disclosed in patent document 1 includes surge absorbing elements such as varistors coupled between the R-phase and the neutral phase (N-phase), the S-phase and the N-phase, and the T-phase and the N-phase. Normally (that is, when no lightning surges occur), there is no conduction through the surge absorbing elements. When a lightning surge occurs, a high voltage of the lightning surge causes conduction through the surge absorbing elements, and the lightning surge is returned to the system side. Thus, the load side is protected against the lightning surge.

RELATED ART DOCUMENTS

Patent Documents

Patent document 1: Japanese Unexamined Patent Application Publication No. 2005-216829

SUMMARY OF THE INVENTION

Problems to be Solved by the Invention

In the configuration recited in patent document 1, the surge absorbing elements are coupled between the R-phase and the N-phase, the S-phase and the N-phase, and the T-phase and the N-phase. However, when independent earthing wires (E-phase) are provided between the R-phase and the S-phase, the S-phase and the T-phase, and the T-phase and the R-phase, no surge absorbing elements are coupled between the R-phase and the E-phase, the S-phase and the E-phase, the T-phase and the E-phase, and the N-phase and the E-phase. Thus, a sufficiently effective measure is not taken to protect the load side from lightning surges.

From a coupling facilitating perspective, commercially available surge modules include: a three-phase three-wire surge module, in which surge absorbing elements coupled between four terminals are grouped into a module; and a single-phase two-wire surge module, in which surge absorbing elements coupled between three terminals are grouped into a module.

In this respect, the use of a three-phase three-wire surge module and a single-phase two-wire surge module is nowhere described in patent document 1.

In view of the above-described circumstances, it is an object of the present invention to provide such a surge protection circuit in a three-phase four-wire circuit that takes a reliable measure to protect the load side from lightning surges and that ensures facilitated coupling using surge modules.

Problems to be Solved by the Invention

In order to achieve the above-described object, the present invention provides surge protection circuits in three-phase four-wire circuits according to a first aspect and a second aspect.

(1) Surge Protection Circuit in Three-Phase Four-wire Circuit according to the First Aspect A surge protection circuit is in a three-phase four-wire circuit. The three-phase four-wire circuit includes an R-phase, an S-phase, a T-phase, a neutral phase, and an independent earthing wire. The surge protection circuit includes a first three-phase three-wire surge module, a single-phase two-wire surge module, and a second three-phase three-wire surge module. The first three-phase three-wire surge module includes four terminals and surge absorbing elements disposed between the four terminals. The single-phase two-wire surge module includes three terminals and surge absorbing elements disposed between the three terminals. The second three-phase three-wire surge module includes four terminals and surge absorbing elements disposed between the four terminals. The earthing wire is assumed an E-phase. The neutral phase is assumed an N-phase. One phase among the R-phase, the S-phase, the T-phase, the N-phase, and the E-phase is assumed a first phase. One phase among the remaining four phases is assumed a second phase. One phase among the remaining three phases is assumed a third phase. One phase among the remaining two phases is assumed a fourth phase. The one remaining phase is assumed a fifth phase. The terminals of the first three-phase three-wire surge module are respectively coupled to the first phase, the second phase, the third phase, and the fifth phase. The terminals of the single-phase two-wire surge module are respectively coupled to one phase among the first, second, and third phases, to the fourth phase, and to the fifth phase. The terminals of the second three-phase three-wire surge module are respectively coupled to two phases among the first, second, and third phases, to the fourth phase, and to the fifth phase. The two phases are not coupled to the single-phase two-wire surge module.

With the first aspect of the present invention, the first three-phase three-wire surge module, the single-phase two-wire surge module, and the second three-phase three-wire surge module ensure protection of the load side from lightning surges between the phases.

Specifically, the first three-phase three-wire surge module ensures surge protection between the first phase and the second phase, between the second phase and the third phase, between the third phase and the first phase, between the first phase and the fifth phase, between the second phase and the fifth phase, and between the third phase and the fifth phase.

The single-phase two-wire surge module ensures surge protection between the fourth phase and one phase among the first, second, and third phases, and between the fourth phase and the fifth phase.

The second three-phase three-wire surge module ensures surge protection between the fourth phase and one phase of the remaining two phases among the first, second, and third phases, and between the other phase and the fourth phase.

Additionally, the use of two three-phase three-wire surge modules and a single single-phase two-wire surge module ensures facilitated coupling.

(2) Surge Protection Circuit in the Three-Phase Four-Wire Circuit According to the Second Aspect A surge protection circuit is in a three-phase four-wire circuit. The three-phase four-wire circuit includes an R-phase, an S-phase, a T-phase, a neutral phase, and an independent earthing wire. The surge protection circuit includes a three-phase three-wire surge module, a first single-phase two-wire surge module, and a second single-phase two-wire surge module. The three-phase three-wire surge module includes four terminals and surge absorbing elements disposed between the four terminals. The first single-phase two-wire surge module includes three terminals and surge absorbing elements disposed between the three terminals. The second single-phase two-wire surge module includes three terminals and surge absorbing elements disposed between the three terminals. The earthing wire is assumed an E-phase. The neutral phase is assumed an N-phase. One phase among the R-phase, the S-phase, the T-phase, the N-phase, and the E-phase is assumed a first phase. One phase among the remaining four phases is assumed a second phase. One phase among the remaining three phases is assumed a third phase. One phase among the remaining two phases is assumed a fourth phase. The one remaining phase is assumed a fifth phase. The terminals of the three-phase three-wire surge module are respectively coupled to the first phase, the second phase, the third phase, and the fifth phase. The terminals of the first single-phase two-wire surge module are respectively coupled to one phase among the first, second, and third phases, to the fourth phase, and to the fifth phase. The terminals of the second single-phase two-wire surge module are respectively coupled to two phases among the first, second, and third phases, and to the fourth phase. The two phases are not coupled to the first single-phase two-wire surge module.

With the second aspect of the present invention, the three-phase three-wire surge module, the first single-phase two-wire surge module, and the second single-phase two-wire surge module ensure protection of the load side from lightning surges between the phases.

Specifically, the three-phase three-wire surge module ensures surge protection between the first phase and the second phase, between the second phase and the third phase, between the third phase and the first phase, between the first phase and the fifth phase, between the second phase and the fifth phase, and between the third phase and the fifth phase.

The first single-phase two-wire surge module ensures surge protection between the fourth phase and one phase among the first, second, and third phases, and between the fourth phase and the fifth phase.

The second single-phase two-wire surge module ensures surge protection between the fourth phase and one phase among the remaining two phases among the first, second, and third phases, and between the other phase and the fourth phase.

Additionally, the use of a single three-phase three-wire surge module and two single-phase two-wire surge modules ensures facilitated coupling.

Effects of the Invention

Thus, the present invention provides such a surge protection circuit in a three-phase four-wire circuit that takes a reliable measure to protect the load side from lightning surges, and that ensures facilitated coupling using surge modules.

MODES FOR CARRYING OUT THE INVENTION

Embodiments of the present invention will be described below by referring to the accompanying drawings. It is noted that the embodiments are provided merely for exemplary purposes and are not intended to limit the present invention.

Figure 1:
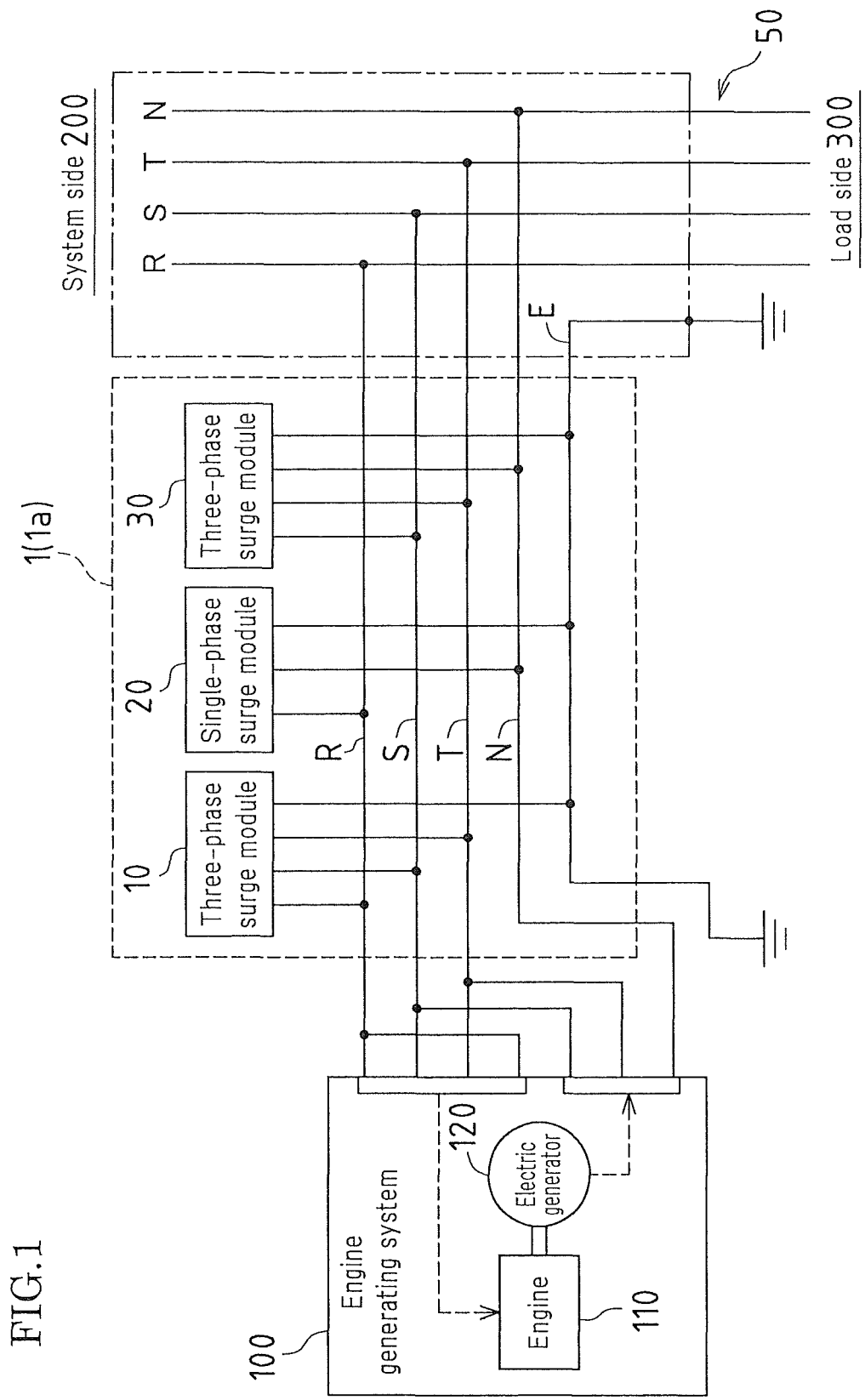
FIG. 1 is a circuit diagram of a surge protection circuit in a three-phase four-wire circuit according to an embodiment of the present invention, illustrating an example in which the surge protection circuit is applied to an engine generating system.

FIG. 1 is a circuit diagram of a surge protection circuit 1 in a three-phase four-wire circuit 50 according to an embodiment of the present invention, illustrating an example in which the surge protection circuit 1 is applied to an engine generating system 100.

The engine generating system 100 shown in FIG. 1 converts output from an engine 110 into electric power at an electric generator 120 so as to supply the electric power to a load side 300. The engine generating system 100, at the same time, establishes a system interconnection with a system side 200.

The system side 200 and the load side 300 are coupled to one another by the three-phase four-wire circuit 50. An independent earthing wire E (hereinafter referred to as E-phase) is provided. The three-phase four-wire circuit 50 is coupled to the engine generating system 100.

Specifically, the three-phase four-wire circuit 50 shown in FIG. 1 includes an R-phase R, an S-phase S, a T-phase T, a neutral phase N (hereinafter referred to as N-phase), and an earthing phase E. The three-phase four-wire circuit 50 has one side coupled to the system side 200 and the other side coupled to the load side 300.

In case of lightning surges, and to ensure protection of the load side 300 against the lightning surges, the three-phase four-wire circuit 50 includes a surge protection circuit 1 (1a) according to the first embodiment or a surge protection circuit 1 (1b) according to the second embodiment, which will be described below. FIG. 1 shows the surge protection circuit 1(1a) according to the first embodiment.

First Embodiment

Figure 2:
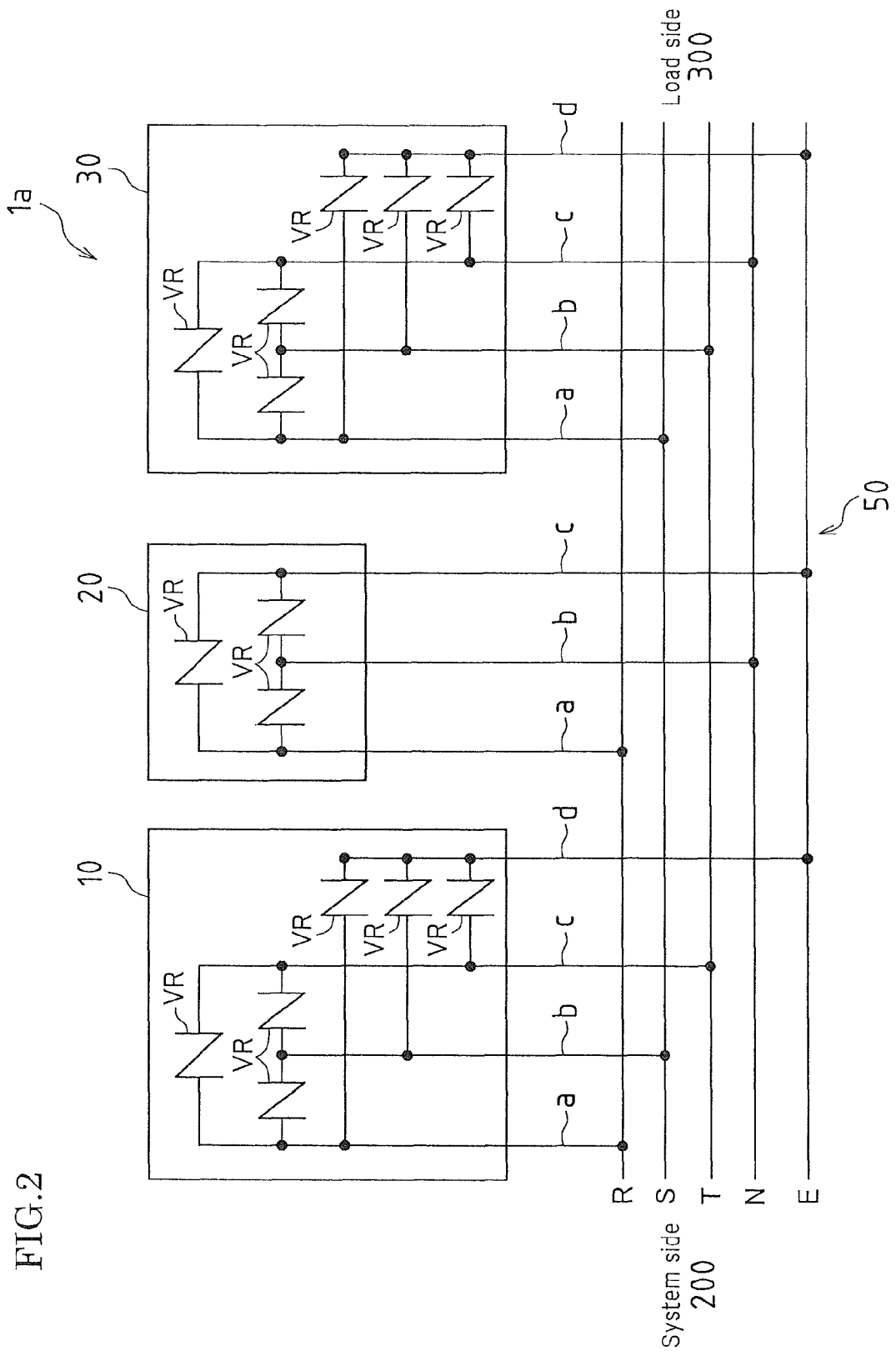
FIG. 2 is a detailed diagram of a surge protection circuit according to a first embodiment of the present invention.

FIG. 2 is a detailed diagram of the surge protection circuit 1(1a) according to the first embodiment of the present invention.

The surge protection circuit 1(1a) according to the first embodiment includes a first three-phase three-wire surge module 10, a single-phase two-wire surge module 20, and a second three-phase three-wire surge module 30.

The first and second three-phase three-wire surge modules 10 and 30 each include surge absorbing elements VR (varistors in this embodiment), which are coupled between four terminals a to d, that is, between the terminals (a, b), between the terminals (a, c), between the terminals (a, d), between the terminals (b, c), between the terminals (b, d), and between the terminals (c, d).

The single-phase two-wire surge module 20 includes surge absorbing elements VR (varistors in this embodiment), which are coupled between three terminals a to c, that is, between the terminals (a, b), between the terminals (a, c), and between the terminals (b, c).

The first three-phase three-wire surge module 10 has its terminals a to d respectively coupled to the R-phase R (which is an exemplary first phase), to the S-phase S (which is an exemplary second phase), to the T-phase T (which is an exemplary third phase), and to the E-phase E (which is an exemplary fifth phase).

The single-phase two-wire surge module 20 has its terminals a to c respectively coupled to: one phase (R-phase R in the illustrated example) among the R-phase R, the S-phase S, and the T-phase T; to the N-phase N (which is an exemplary fourth phase); and to the E-phase E.

The second three-phase three-wire surge module 30 has its terminals a to d respectively coupled to: two phases (S-phase S and T-phase T in the illustrated example) that are not coupled to the single-phase two-wire surge module 20, among the R-phase R, the S-phase S, and the T-phase T; to the N-phase N; and to the E-phase E.

With the surge protection circuit 1(1a) according to the first embodiment of the present invention, the first three-phase three-wire surge module 10, the single-phase two-wire surge module 20, and the second three-phase three-wire surge module 30 ensure protection of the load side 300 from lightning surges between the phases, namely, the R-phase R, the S-phase S, the T-phase T, the N-phase N, and the E-phase E.

Specifically, the first three-phase three-wire surge module 10 ensures surge protection between the R-phase R and the S-phase S, between the S-phase S and the T-phase T, between the T-phase T and the R-phase R, between the R-phase R and the E-phase E, between the S-phase S and the E-phase E, and between the T-phase T and the E-phase E.

The single-phase two-wire surge module 20 ensures surge protection between the N-phase N and one phase (R-phase R in the illustrated example) among the R-phase R, the S-phase S, and the T-phase T, and between the N-phase N and the E-phase E. Between the R-phase R and the E-phase E, there is a redundancy of surge absorbing elements between the single-phase two-wire surge module 20 and the first three-phase three-wire surge module 10.

The second three-phase three-wire surge module 30 ensures surge protection between the N-phase N and one phase (S-phase S in the illustrated example) of two remaining phases among the R-phase R, the S-phase S, and the T-phase T, and between the other phase (T-phase T in the illustrated example) and the N-phase N. Between the S-phase S and the T-phase T, between the S-phase S and the E-phase E, and between the T-phase T and the E-phase E, there are redundancies of surge absorbing elements between the second three-phase three-wire surge module 30 and the first three-phase three-wire surge module 10. Between the N-phase N and the E-phase E, there is a redundancy of surge absorbing elements between the second three-phase three-wire surge module 30 and the single-phase two-wire surge module 20.

Additionally, the use of two three-phase three-wire surge modules 10 and 30 and a single single-phase two-wire surge module 20 ensures facilitated coupling.

Second Embodiment

Figure 3:
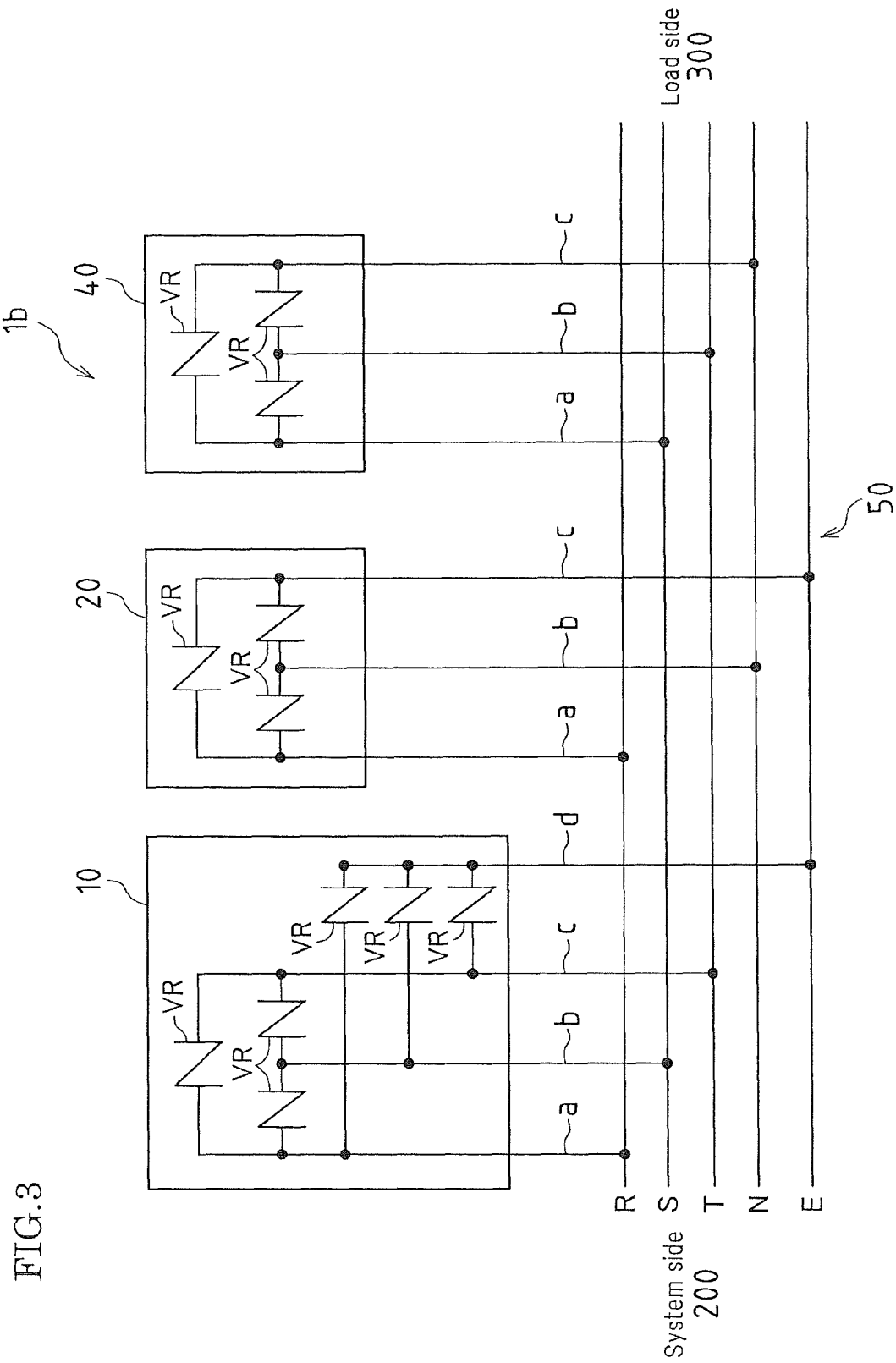
FIG. 3 is a detailed diagram of a surge protection circuit according to a second embodiment of the present invention.

FIG. 3 is a detailed diagram of the surge protection circuit 1(1b) according to the second embodiment of the present invention.

In the surge protection circuit 1(1b) shown in FIG. 3, the same elements as those of the surge protection circuit 1(1a) shown in FIG. 2 are designated the same reference numerals.

The surge protection circuit 1(1b) according to the second embodiment includes a three-phase three-wire surge module 10, a first single-phase two-wire surge module 20, and a second single-phase two-wire surge module 40.

The three-phase three-wire surge module 10 includes surge absorbing elements VR (varistors in this embodiment), which are coupled between four terminals a to d, that is, between the terminals (a, b), between the terminals (a, c), between the terminals (a, d), between the terminals (b, c), between the terminals (b, d), and between the terminals (c, d).

The first and second single-phase two-wire surge modules 20 and 40 each include surge absorbing elements VR (varistors in this embodiment), which are coupled between three terminals a to c, that is, between the terminals (a, b), between the terminals (a, c), and between the terminals (b, c).

The three-phase three-wire surge module 10 has its terminals a to d respectively coupled to the R-phase R (which is an exemplary first phase), to the S-phase S (which is an exemplary second phase), to the T-phase T (which is an exemplary third phase), and to the E-phase E (which is an exemplary fifth phase).

The first single-phase two-wire surge module 20 has its terminals a to c respectively coupled to: one phase (R-phase R in the illustrated example) among the R-phase R, the S-phase S, and the T-phase T; to the N-phase N (which is an exemplary fourth phase); and to the E-phase E.

The second single-phase two-wire surge module 40 has its terminals a to d respectively coupled to: two phases (S-phase S and T-phase T in the drawing as examples) that are not coupled to the first single-phase two-wire surge module 20, among the R-phase R, the S-phase S, and the T-phase T; and to the N-phase N.

With the surge protection circuit 1(1b) according to the second embodiment of the present invention, the three-phase three-wire surge module 10, the first single-phase two-wire surge module 20, and the second single-phase two-wire surge module 40 ensure protection of the load side 300 from lightning surges between the phases, namely, the R-phase R, the S-phase S, the T-phase T, the N-phase N, and the E-phase E.

Specifically, the three-phase three-wire surge module 10 ensures surge protection between the R-phase R and the S-phase S, between the S-phase S and the T-phase T, between the T-phase T and the R-phase R, between the R-phase R and the E-phase E, between the S-phase S and the E-phase E, and between the T-phase T and the E-phase E.

The first single-phase two-wire surge module 20 ensures surge protection between the N-phase N and one phase (R-phase R in the illustrated example) among the R-phase R, the S-phase S, and the T-phase T, and between the N-phase N and the E-phase E. Between the R-phase R and the E-phase E, there is a redundancy of surge absorbing elements between the first single-phase two-wire surge module 20 and the three-phase three-wire surge module 10.

The second single-phase two-wire surge module 40 ensures surge protection between the N-phase N and one phase (S-phase S in the illustrated example) of the two remaining phases among the R-phase R, the S-phase S, and the T-phase T, and between the other phase (T-phase T in the illustrated example) and the N-phase N. Between the S-phase S and the T-phase T, there is a redundancy of surge absorbing elements between the second single-phase two-wire surge module 40 and the three-phase three-wire surge module 10.

Additionally, the use of a single three-phase three-wire surge module 10 and two single-phase two-wire surge modules 20 and 40 ensures facilitated coupling.

Thus, the surge protection circuit 1(1a) according to the first embodiment and the surge protection circuit 1(1b) according to the second embodiment take a reliable measure to protect the load side 300 from lightning surges and ensure facilitated coupling using commercially available surge modules.

DESCRIPTION OF THE REFERENCE NUMERAL

R R-phase (exemplary first phase)
S S-phase (exemplary second phase)
T T-phase (exemplary third phase)
N N-phase (exemplary fourth phase)
E E-phase (exemplary fifth phase)
VR Surge absorbing element
1(1a) Surge protection circuit according to the first embodiment 1(1b) Surge protection circuit according to the second embodiment
10 Three-phase three-wire surge module
20 Single-phase two-wire surge module
30 Three-phase three-wire surge module
40 Single-phase two-wire surge module
50 Three-phase four-wire circuit
200 System side
300 Load side

The invention claimed is:

1. A surge protection circuit in a three-phase four-wire circuit, the three-phase four-wire circuit consisting of an R-phase, an S-phase, a T-phase, a neutral phase, and an independent earthing wire, the surge protection circuit consisting of:
   a first three-phase three-wire surge module consisting of four terminals and surge absorbing elements disposed between the four terminals;
   a single-phase two-wire surge module consisting of three terminals and surge absorbing elements disposed between the three terminals; and
   a second three-phase three-wire surge module consisting of four terminals and surge absorbing elements disposed between the four terminals,
   wherein the earthing wire is assumed an E-phase, the neutral phase is assumed an N-phase, one phase among the R-phase, the S-phase, the T-phase, the N-phase, and the E-phase is assumed a first phase, one phase among the remaining four phases is assumed a second phase, one phase among the remaining three phases is assumed a third phase, one phase among the remaining two phases is assumed a fourth phase, and the one remaining phase is assumed a fifth phase,
   wherein the terminals of the first three-phase three-wire surge module are respectively coupled to the first phase, the second phase, the third phase, and the fifth phase,
   wherein the terminals of the single-phase two-wire surge module are respectively coupled to one phase among the first, second, and third phases, to the fourth phase, and to the fifth phase, and
   wherein the terminals of the second three-phase three-wire surge module are respectively coupled to two phases among the first, second, and third phases, to the fourth phase, and to the fifth phase, the two phases being not coupled to the single-phase two-wire surge module,
   wherein the first three-phase three-wire surge module, the single-phase two-wire surge module, and the second three-phase three-wire surge module are separated from each other.

2. A surge protection circuit in a three-phase four-wire circuit, the three-phase four-wire circuit consisting of an R-phase, an S-phase, a T-phase, a neutral phase, and an independent earthing wire, the surge protection circuit consisting of:
   a three-phase three-wire surge module consisting of four terminals and surge absorbing elements disposed between the four terminals;
   a first single-phase two-wire surge module consisting of three terminals and surge absorbing elements disposed between the three terminals; and
   a second single-phase two-wire surge module consisting of three terminals and surge absorbing elements disposed between the three terminals,
   wherein the earthing wire is assumed an E-phase, the neutral phase is assumed an N-phase, one phase among the R-phase, the S-phase, the T-phase, the N-phase, and the E-phase is assumed a first phase, one phase among the remaining four phases is assumed a second phase, one phase among the remaining three phases is assumed a third phase, one phase among the remaining two phases is assumed a fourth phase, and the one remaining phase is assumed a fifth phase,
   wherein the terminals of the three-phase three-wire surge module are respectively coupled to the first phase, the second phase, the third phase, and the fifth phase,
   wherein the terminals of the first single-phase two-wire surge module are respectively coupled to one phase among the first, second, and third phases, to the fourth phase, and to the fifth phase, and
   wherein the terminals of the second single-phase two-wire surge module are respectively coupled to two phases among the first, second, and third phases, and to the fourth phase, the two phases being not coupled to the first single-phase two-wire surge module,
   wherein the three-phase three-wire surge module, the first single-phase two-wire surge module, and the second single-phase two-wire surge module are separated from each other.

3. A surge protection circuit in a three-phase four-wire circuit, the three-phase four-wire circuit consisting of an R-phase, an S-phase, a T-phase, a neutral phase, and an independent earthing wire, the surge protection circuit consisting of:
   a first three-phase three-wire surge module consisting of four terminals and surge absorbing elements disposed between the four terminals;
   a first single-phase two-wire surge module consisting of three terminals and surge absorbing elements disposed between the three terminals; and
   either one of a second three-phase three-wire surge module consisting of four terminals and surge absorbing elements disposed between the four terminals or a second single-phase two-wire surge module consisting of three terminals and surge absorbing elements disposed between the three terminals,
   wherein the first three-phase three-wire surge module; the first single-phase two-wire surge module; and either one of the second three-phase three-wire surge module or the second single-phase two-wire surge module, are separated from each other.

* * * * *